(12) United States Patent
Kim et al.

(10) Patent No.: US 8,401,839 B2
(45) Date of Patent: Mar. 19, 2013

(54) METHOD AND APPARATUS FOR PROVIDING HYBRID AUTOMATIC TRANSLATION

(75) Inventors: Chang Hyun Kim, Daejeon (KR); Young Ae Seo, Daejeon (KR); Young-Sook Hwang, Daejeon (KR); Young Kil Kim, Daejeon (KR); Sung Kwon Choi, Daejeon (KR); Oh Woog Kwon, Daejeon (KR); Ki Young Lee, Daejeon (KR); Seong Il Yang, Daejeon (KR); Yun Jin, Daejeon (KR); Yoon Hyung Roh, Daejeon (KR); Changhao Yin, Daejeon (KR); Eun Jin Park, Daejeon (KR); Ying Shun Wu, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1141 days.

(21) Appl. No.: 12/326,758

(22) Filed: Dec. 2, 2008

(65) Prior Publication Data

US 2009/0157380 A1 Jun. 18, 2009

(30) Foreign Application Priority Data

Dec. 18, 2007 (KR) .................. 10-2007-0133677

(51) Int. Cl.
*G06F 17/28* (2006.01)

(52) U.S. Cl. ............................... 704/5; 704/4

(58) Field of Classification Search ............... 704/1–10
See application file for complete search history.

(56) References Cited

U.S. PATENT DOCUMENTS

| | | | | |
|---|---|---|---|---|
| 5,088,038 A | * | 2/1992 | Tanaka et al. | 704/2 |
| 5,136,503 A | * | 8/1992 | Takagi et al. | 704/2 |
| 5,579,224 A | * | 11/1996 | Hirakawa et al. | 704/2 |
| 2002/0116169 A1 | * | 8/2002 | Ait-Mokhtar et al. | 704/1 |
| 2003/0101044 A1 | * | 5/2003 | Krasnov | 704/4 |
| 2008/0133245 A1 | * | 6/2008 | Proulx et al. | 704/277 |
| 2008/0154577 A1 | * | 6/2008 | Kim et al. | 704/2 |

FOREIGN PATENT DOCUMENTS

| | | |
|---|---|---|
| JP | 2004-280467 A | 10/2004 |
| KR | 1020050027298 A | 3/2005 |

OTHER PUBLICATIONS

Paul et al., "Nobody is Perfect: ATR's Hybrid Approach to Spoken Language Translation", In Proc. of IWSLT, pp. 55-62, 2005.*
Kim, Changhyun et al., "Verb Pattern Based Korean-Chinese Machine Translation System," 2002, pp. 157-165, Association for Machine Translation in the Americas.

* cited by examiner

*Primary Examiner* — Samuel G Neway (57) ABSTRACT

The present invention provides a Korean-English hybrid automatic translation method for providing translation from Korean to English, includes: performing a morpheme analysis and a syntactic analysis on a Korean input source text; segmenting the Korean input source text into at least two source text segments, based on the results of the morpheme analysis and the syntactic analysis; and generating a PBMT (pattern-based machine translation) translated text segment and a SMT (statistical machine translation) translated text segment with respect to each of the source text segments. Further, the method includes determining, as final translation result, one of the PBMT translated text segment and the SMT translated text segment with respect to each source text segment, based on predetermined weight information; and composing the translated text segments with respect to the source text segments of the Korean input source text into one English translated text by using the determined final translation results.

10 Claims, 2 Drawing Sheets

METHOD AND APPARATUS FOR PROVIDING HYBRID AUTOMATIC TRANSLATION

CROSS-REFERENCE(S) TO RELATED APPLICATIONS

The present invention claims priority of Korean Patent Application No. 10-2007-0133677, filed on Dec. 18, 2007, which is incorporated herein by reference.

FIELD OF THE INVENTION

The present invention relates to a method and an apparatus of Korean-English hybrid automatic translation and, more particularly, a method and an apparatus for providing hybrid automatic translation from Korean to English, which combine the pattern-based machine translation technology and the statistical machine translation technology.

This work was supported by the IT R&D program of MIC/IITA. [2006-S-037-02, Domain Customized Machine Translation Technology Development for Korean, Chinese, English]

BACKGROUND OF THE INVENTION

The conventional pattern-based machine translation technology provides good translation quality at a fast translation speed when a translation pattern regarding a sentence to be translated is available. However, the conventional technology provides poor translation quality when a translation pattern regarding a sentence to be translated is not available because the sentence to be translated is not a common source which has been translated frequently for the translation field.

Further, the conventional statistical machine translation technology translates a source sentence well when translation models can be statistically sufficiently learned because there are abundant bilingual corpuses with respect to the source sentence, however, it provides a translation of a source sentence with a poor quality at a low translation speed when there are sufficient the bilingual corpuses with respect to the source sentence. Besides, the conventional statistical machine translation technology has no sufficient information on an analysis of a source language, it does not employ the models using the information on the analysis of the source language, so that the translation thereby cannot have good quality.

SUMMARY OF THE INVENTION

It is, therefore, an object of the present invention to provide a method and apparatus for providing hybrid machine translation, which are capable of generating better final translation output by taking the advantages of the pattern-based machine translation technology and the advantages of the statistical machine translation technology.

That is, in the pattern-based machine translation technology, a sentence is segmented into a translatable segment unit, and when a statistical machine translation output with respect one segment is better than pattern-based machine translation output in quality, the statistical machine translation output is selected, thereby generating the final pattern-based translation output by composing the statistical machine translation output with pattern-based machine translation outputs with respect to the other segments. Further, the statistical machine translation technology uses information regarding source text analysis and the sentence segmentation which are performed in the pattern-based machine translation technology, thereby improving the translation quality and translation speed.

Accordingly, by evaluating the pattern-based machine translation output and the statistical machine translation output, better translation output is selected.

In accordance with an aspect of the present invention, there is provided an Korean-English hybrid automatic translation apparatus for providing hybrid machine translation from Korean to English, including: a source text translation manger for receiving analysis results of a Korean analyzer with respect to a Korean input source text and normalizing the Korean input source text; a translator for generating PBMT (pattern-based machine translation) translated text segments and SMT (statistical machine translation) translated text segments with respect to the Korean input sentence text normalized by the source text translation manager; and a target text translation manger for managing generation of a final English translated text of the Korean input source text by using the generation of the PBMT translated text segments and the SMT translated text segments.

It is preferable that the source text translation manger has a sentence segmentation unit for segmenting the Korean input source text to be translated; a sentence pattern matching unit for providing English translation information with respect to expressions in the Korean input source text based on sentence patterns for a sentence unit concerning the Korean input source text; and a paraphraser for paraphrasing each short sentence and sentence structure of the Korean input source text.

Further, the sentence segmentation unit may segment the Korean input source text into clause units within a predetermined range preventing mistranslation, and the predetermined range may be 95% or more in segmentation accuracy.

Further, the sentence pattern matching unit may build the sentence patterns with respect to sentences with a certain number of words, determines sentence pattern types, and performs patterning.

Further, the paraphraser may paraphrase sentence expressions in the Korean input source text without distorting the meaning thereof.

Further, it is preferable that the target text translation manager includes: a segment composing unit for composing the translated text segments and generating final English translated text of the Korean input source text; and a translated text selecting unit for determining one of the PBMT translated text and the SMT translated text, by using weight of the Korean input source text, time limit, weight of a linguistic model, and weight of a translation model.

The segment composing unit may perform reflection of is the sentence patterns, connection of the translated text segments of the source text segments based on a source segment connection pattern, and refinement of the final English translated text candidates.

In accordance with another aspect of the present invention, there is provided a Korean-English hybrid automatic translation method for providing translation from Korean to English including: performing a morpheme analysis and a syntactic analysis on a Korean input source text; segmenting the Korean input source text into at least two source text segments, based on the results of the morpheme analysis and the syntactic analysis; generating a PBMT (pattern-based machine translation) translated text segment and a SMT (statistical machine translation) translated text segment with respect to each of the source text segments; determining, as final translation result, one of the PBMT translated text segment and the SMT translated text segment with respect to each source text segment, based on predetermined weight information; and composing the translated text segments with respect to the source text segments of the Korean input source text into one English translated text by using the determined final translation results.

It is preferable that the method further includes performing sentence pattern matching and paraphrasing after performing the morpheme analysis and the syntactic analysis.

The method may include revising the sentence segments and then generating the PBMT translated text segment and the SMT translated text segment thereof, respectively.

Further, the predetermined weight information may include one or more from weight of the Korean source text, time limit, weight of a linguistic model, and weight of a translation model.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings so that they can be readily implemented by those skilled in the art.

Figure 1:
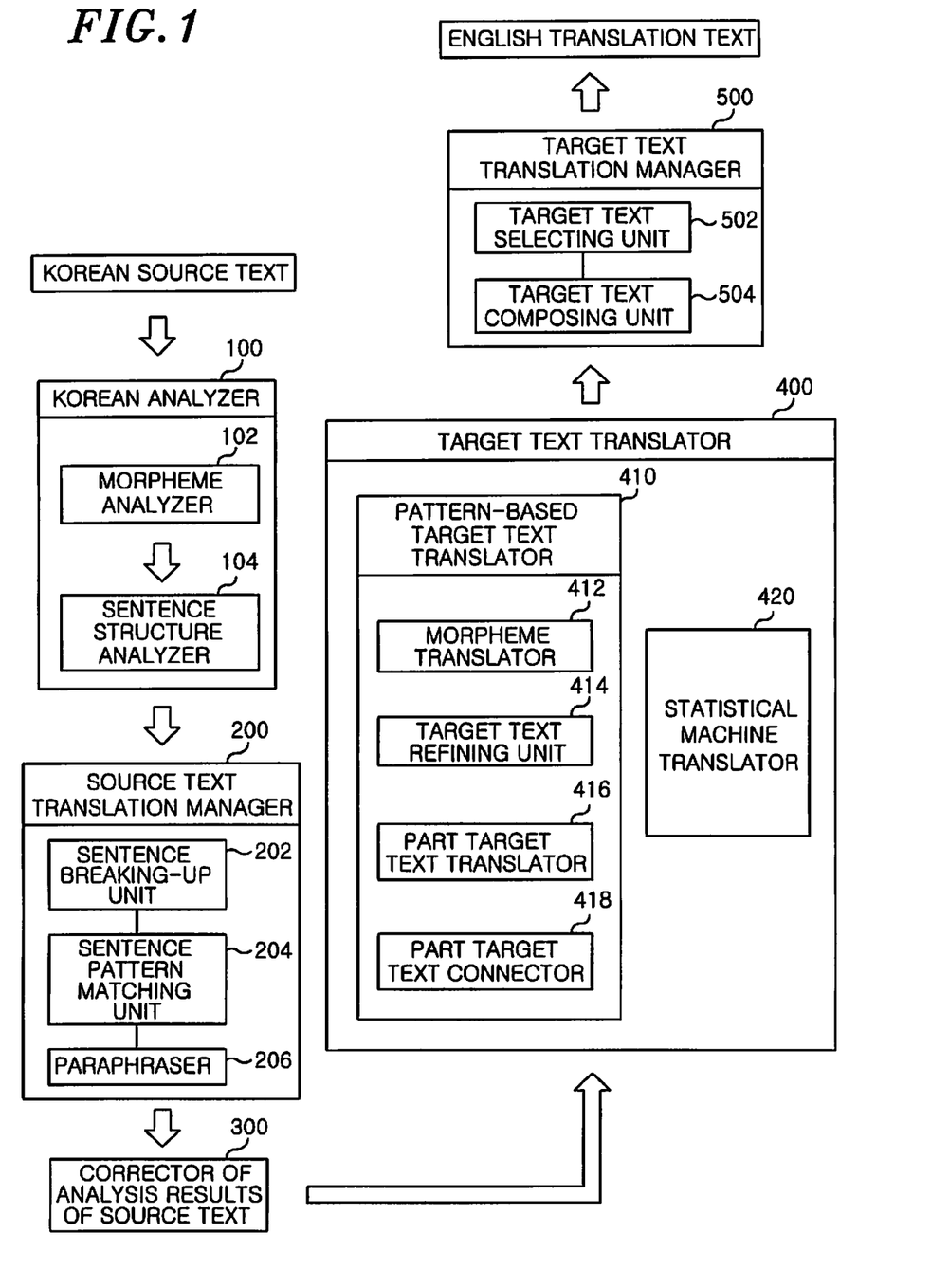
FIG. 1 illustrates an Korean-English hybrid automatic translation apparatus in accordance with an embodiment of the present invention.

FIG. 1 is a block diagram of a Korean-English automatic translation apparatus in accordance with an embodiment of the present invention. The translation apparatus has a Korean analyzer 100, translation managers 200 and 500, and a translator 400. The translator includes a statistical machine translation (hereinafter, referred to as "SMT") engine, e.g., a SMT translator 420, and a pattern-based machine translation (hereinafter, referred to as "PBMT") engine, e.g., a PBMT translator 410.

The Korean analyzer 100 includes a morpheme analyzer 102 and a syntactic analyzer 104. Analysis results are input into both of the SMT translator 420 and the PBMT translator 410.

The translation manager includes a source text translation manager 200 for a Korean input source text, and a target text translation manager 500. The source text translation manager 200 performs sentence segmentation, sentence pattern matching, and paraphrasing on the Korean input source text, analysis of the Korean input source text being completed. The target text translation manager 500 receives translation outputs of the translator 400, selects the best translation outputs, and combines the best translation outputs to be a final English translated text.

The outputs from the source text translation manager 200 are transferred to the translator 400, via a source text analysis result revising unit 300, and translated by the PMBT translator 410 and the SMT translator 420. As a result, each of the SMT and PBMT engines provides the most suitable translation output. The most suitable translation output is input into a translation selecting unit 502 of the target text translation manager 500.

The translation selecting unit 502 determines the best translation output among the translated text by the SMT translator 420 and the translated text by a PBMT translator 410 based on predetermined weight information, for example, source text weight, time limit, linguistic model weight, translation model weight, and the like.

A segment composing unit 504 finally combines translated text segment into an English sentence, by using target text information for a matched sentence pattern and target text connection information for connecting the translated text segment.

The source text translation manager 200 and the target text translation manager 500 perform management of the translation working with the PBMT translator 410 and the SMT translator 420. For example, the source text translation manager 200 and the target text translation manager 500 perform the segmentation of a long sentence, pattern matching for processing parts of an input sentence which are translatable based on a sentence pattern, unregistered word processing for providing information of unregistered words and information of translation of the unregistered words, paraphrasing for lowering the degree of difficulty in matching the sentence pattern and translating the input text, evaluating the translation output of each engine to select the best translated text segment, and combining the best translated text segments which are translation segment units of the source sentence.

The apparatus for providing hybrid machine translation from Korean to English in accordance with the present invention performs morpheme analysis, pre-process of syntactic analysis, syntactic analysis, connection and generating of translated text, morpheme generation, and the like. Therefore, the source text translation manager 200 and the target text translation manager 500 performing the operations aforementioned will be described in more detail below:

The source text translation manager 200 is a module for receiving the analysis results of the Korean source text by the Korean analyzer 100, and normalizing the Korean source text which is difficult to be translated due to an ambiguous expression in a colloquial style and the like to be more easily translated.

As illustrated in FIG. 1, the source text translation manager 200 includes a sentence segmentation unit 202, a pattern matching unit 202, and a paraphraser 204.

The sentence segmentation unit 202 segments a long Korean sentence into a Korean text segment to be translated. The sentence matching unit 204 previously provides English translation information on expressions in the sentence based on the sentence patterns of the sentence, with respect to a sentence which is difficult to be processed by the translator 400.

The paraphraser 206 paraphrases each short sentence or sentence structure to be changed into the form being more easily translated.

Each element of the source text translation manager 200 will be described below in more detail.

<Sentence Segmentation Unit 202>

An excessively long sentence may cause an error in analyzing a sentence structure to be a negative effect on the translation speed and the translation accuracy. Specifically, since a SMT system requires a long search time due to a huge space of hypothesis thereof, the translation speed thereof is slow, compared to a PBMT system. As the sentence is longer, a search speed is slower. Then, if pruning is performed in order to make the search speed fast, a more proper translation candidate is excluded from the hypothesis space.

Therefore, the sentence segmentation unit 202 in accordance with the present invention segments a sentence into translatable clause units which do not cause mistranslation and provides the translatable clause units results thereof to the apparatus for providing hybrid machine translation based on the SMT/PBMT. The translation clause segments of the translatable clause units are combined during a segment combination process of the target text translation manager 500 to generate a translation of the sentence. Improper segmentation performed by the sentence segmentation unit 202 results in occurrence of an serious error in translation. Therefore, the sentence segmentation unit 202 performs the segmentation only when the accuracy of segmentation of the sentence is 95% or greater than. [Example 1] describes examples that performing the segmentation can be permitted.

In the examples described below, "//" represents a segmentation point at which a sentence can be segmented. When the segmented performed at the segmentation point, the segmented sentence segments positioned at before and after the segmentation point in the sentence are translated independently, and then the translated sentence segments are combined by the target text translation manager 500.

Example 1

Segmentation of a sentence can be permitted in the following cases:

a. after an inflected word+a final ending of the word b. where an ellipsis (" . . . ") follows after an inflected word+a conjunctive ending of the word c. where a comma (",") follows after an inflected word+a conjunctive ending of the word d. after an inflected word+the conjunctive ending of the word, which has less segmentation errors of a sentence <Sentence Pattern Matching Unit 204>

A common sentence, which is a conversational style frequently used in a drama and the like, can be translated properly by sentence patterning process. This sentence pattern process recognize a sentence pattern of a sentence prior to the machine translation based on an inflected word phrase pattern and generates proper translation outputs thereof according to the sentence pattern. The conversational style frequently includes an expression which is difficult to be linguistically analyzed. Therefore, the translation of the sentence of the conversational style needs a method, without a perfect analysis of a sentence structure thereof, for generating translation words with respect to the sentence determined as a sentence pattern.

In the conversation style sentence, the number of words constituting the sentence is less, but there are a number of expressions frequently used. As the number of the words is smaller, the coverage of sentence patterns to be constructed relatively increases. Therefore, it is more advantageous to first construct sentence patterns for sentences each consisting of smaller number of words.

As for the drama conversationally style sentences, sentence patterns with respect to sentences with a few words, e.g., four or six words, are first constructed, and then sentence patterns with respect to other sentences used frequently are determined for patterning to be constructed.

For sentence pattern matching, a morpheme vocabulary is used as a matching unit, and a sentence structure is used as a token of a pattern. [Example 2] shows a matching unit which is analyzed according to the morphemes of the sentence pattern.

Example 2

$n_1$ 살짜리 NP1이 있어요? (Do you have a n1-year-old NP1?)

=> Do:v you:s have a n1-year-old NP1?

10 살짜리 아들이 있어요? (Do you have a 10-year-old boy?)

The units for sentence pattern matching may be the noun phrase, such as NP, the numerical adjective, such as n1, the stem of a verb represented as ":v", and the like. A special form, such as a subject to be restored, is represented as an additional mark such as ":s".

a. a simple exclamation sentence expressing feeling or appellation b. a short sentence consisting of a few words c. a sentence pattern construction according to numerical description d. idiomatic expression <Paraphraser 206>

In the drama conversational style sentences, there are various linguistic expressions for expressing the mood of a speaker, so that a distorted phonological phenomenon may occur. For example, fillers and expressions for speaking, slang words, dialects, and expressional words which do not needs to be translated are used. The sentence including the aforementioned particular expressions of the conversational style can be transformed various other expressions with the same meaning thereof. Due to the variety of the expressions, it is difficult to gain the knowledge for logistical analysis, and the ambiguity in the analysis is increased due to the use of variation of the original vocabulary. Therefore, the conversational style sentence needs normalization and refinement of expressions in the sentence without distortion of the meaning of the sentence.

Paraphrasing is a method for clarifying expressions in a sentence without distorting the meaning of the sentence. [Example 3] is examples showing a target sentence for paraphrasing.

Example 3 a. Refinement of a sentence by removing fillers and expressions and repeated words (tagging problem)

ex) 어! 저, 저 짱께 새끼 저거 . . . (Oh! that, that, that chink)/아유, 속상해 뒈지 겠네, 진짜 (Ah, I feel so bad, really)

b. Paraphrasing of dialect/abuse/sentence structure by change thereof into the easily translatable form with same meaning ex) 아유, 속상해 돼 지겠네, 진짜 (Ah, I feel so bad, really)

c. Synonym aggregation of predicate phrase and noun phrase: aggregation of sentence structures being used in the syntactically and semantically same manner (change of vocabulary and structure by using statistical information based on corpus and dictionaries)

ex) 가죽으로 된 갈색 가방 (a brown bag mad of leather)/갈색 가죽가방 (a brown leather bag)/브라운 톤 가죽가방 (a brown color leather bag)

ex) 돌아가는 표 (a ticket for returning)/귀국티켓 (a returning ticket)

ex) 들어가 있는지 (whether it is included)/포함되어 있는지 (whether it is comprised)

ex) 얼마나 용썼는지 (how much I exerted my utmost strength)/얼마나 노력했는지 (how much I endeavored)

ex) 미열 (a slight fever)/열이 약간 (have some fever)

ex) 맛있는 해산물 (delicious seafood)/괜찮은 해산물 (nice seafood)/좋은 해산물 (good seafood)

d. Paraphrasing to clearly express implied/paradoxical expressions ex) 잠깐 떨어져 있자 (let's have some time to think of our relationship)/뭘 어떻게 해, 데리고 가야지 (what else? Take him)

e. Paraphrasing of sentence structures including passive/active/inversion expressions and the like f. Paraphrasing of paradoxically emphasizing expressional sentence structure ex) 뭘 어떻게 해, 데리고 가야지 (what else? We should take him): 당연히, 데리고 가야지 (of course, we should take him)

ex) X없습니까? (Is X here?)—do you have X?: X가지고 있어요?

ex) 니가 이러고 있는데 나 혼자 어떻게 가? (How can I leave you when you're in a bad mood like this?)

The paraphraser 206 paraphrases a source input text sentence to be in an easily translatable form. To this end, paraphrasing information is built by automatically searching an object to be paraphrased in the bilingual corpus. Human may directly confirm whether the paraphrased sentence structure is natural and then the sentence is paraphrased so that paraphrasing knowledge is built based on the paraphrasing, and paraphrasing rules can be deduced from paraphrasing aggregation. The paraphrasing knowledge is formed by changing the word order, by using the sentence structure change rules, by changing, deleting and/or adding vocabularies of the sentence to be translated.

Regarding the Korean sentence, the translator 400 outputs one translation output of the PBMT translator 410 and n translation outputs of the SMT translator 420 (in the present embodiment, the SMT translator 420 outputs a maximum of two translations).

When m−1 segmentation points are determined in a Korean source sentence by the sentence segmentation unit 202 and the Korean source sentence is segmented into m Korean source segments, n+1 translation segments are generated with respect to each of the m Korean source segments.

The target text translation manager 500 is the module for combining translation segments to form m*(n+1) final translation candidates, selecting the most suitable translation to determine the final English translation of the Korean source sentence. The target text translation manager 500 includes translation selecting unit 502 and a segment combining unit 504.

Each elements of the target text translation manager 500 will be described below, in more detail, with reference to FIG. 1.

<Segment Combining Unit 504>

The sentence combining unit 204 is a module for generating an English translation of a full Korean source text when the sentence segmentation unit 202 of the source text translation manager 200 segments the Korean source text into at least two Korean source segments, by combining the translation of the Korean source segments. Then, since the translator 400 generates n+1 English translation segment of each of the source segments, the translated text combining unit 504 forms m*(n+1) final translation candidates with respect to the Korean source text which is segmented into m source segments.

The translated text composing unit 504 performs a step of reflecting sentence pattern application information on the final translation candidates (applying of the sentence pattern), a step of connecting the source segments, and a step of refining the finally combined sentence.

First, in reflection step of sentence pattern, when the Korean input source text is matched with the sentence pattern, the sentence pattern based target text has to reflect the relevant English target text to the final sentence. The sentence pattern matching may be performed on the entire Korean input source text or each source segment thereof.

Connecting the translation segments of the source segments is performed based on a source segment connection pattern. In the colloquial style, unlike the literary style, the generation of the coordinate conjunctions, such as "and" and "but" are needed to be reduced and the translation segments are need to be connected in a sequential translation form to reflect the order of the source segment, in order to provide more colloquial text translation, prevent mistranslation caused by the connection of the source segments, and revises sentence segmentation. The sequential translation reflects on the English translation ambiguity of a complex sentence which is a characteristic the Korean language has even though it is hard to resolve the ambiguity of a sentence, thereby enabling a reader to analogize the meaning thereof and to solve the ambiguity of the sentence.

During the step of refining the final sentence, the refining processes for the whole text such as unifying the target word of a proper noun, processing a repeated constituent as a pronoun, and making the sequence of the tenses is performed considering the translation segments as a whole. That is, the refining processes are performed on the connected translation segment, refinement of each of the translation segments as a translation segment unit having been completed.

A simulation process of the translated text composing unit 504 will be described below:

For example, the Korean input source text, "윤이 백까지 썼는데... 언니 여기 넣어 줄려고 얼마나 용썼는지 알지?" (In English, "Even got Yun's support . . . you know how much Yun exerted utmost strength?"), is segmented into two source segments as follows after being processed by the sentence segmentation, the sentence pattern matching, and the paraphrasing:

Source segment 1: 윤-이 다른 사람들-에게 도움-을 받-았는데...

PBMT: Yun got help from others.

SMT: Other people helped Yune. But . . . .

Source segment 2: 윤-이 언니-를 여기-에 취직시켜주-려고 (윤- 많이 노력하-었다.

PBMT: Yun tried so much to get you a job here.

SMT: Yune pulled strings to get you a job here.

The translated text combining unit 504 combines the two translation outputs of the Source segment 1 and the two translation outputs of Source segment 2, according to a translation segment connection pattern. Further, the translated text combining unit 504 applying the sentence pattern translation information of "You know" thereto, thereby providing the following four final translation candidates.

translation segment connection pattern

VP1+는데//VP2=>VP1. VP2 (VP is a verb prhase)

Applied sentence pattern

VP1+는지 알지?/VP1+는 줄 알잖아. =>You know, VP1(+source text conversion rule 1).

언니 여기 넣어 줄려고 얼마나 용썼는지 알지?

=> You know, VP1(언니 여기 넣어 줄려 고 얼마나 용썼다. )

Final translation candidate:

1. source text 1-PBMT+source text 2-PBMT:

Yun got help from others. You know, Yun (he) tried so much to get you a job here.

2. source text 1-PBMT+source text 2-SMT:

Yun got help from others. You know, Yun (he) pulled strings to get you a job here.

3. source text 1-SMT+source text 2-SMT

Other people helped Yune. But . . . You know, Yun (he) pulled strings to get you a job here.

4. source text 1-SMT+source text 2-PBMT

Other people helped Yune. But . . . You know, Yun (he) tried so much to get you a job here.

The final translation text is determined among the final translation candidates by the translation selecting unit 502.

<Translation Selecting Unit 502>

Both of the PBMT system or the SMT system is hard to provide perfect translation results regarding any input sentence. Each of the system outputs different translation results, depending on the constructed way of each system and the obtaining method of translation knowledge in each system.

The PBMT system applies the rules/patterns of general-purposed translation knowledge which are sophisticatedly built by translation experts. Therefore, the PBMT system provides neat and accurate translations regarding general sentences to which the rules/patterns can be applied. However, the PMBT system has a tendency to provide crude translation results regarding the conversational sentences including idiomatic expressions.

On the other hand, the SMT system attempts trustful translations according to sentence structure patterns provided during the system training process. Therefore, when using the conversational sentences including many idiomatic expressions as sentence sources for training, the SMT system outputs translation results in the natural conversational style. However, when an input sentence includes a word/sentence structure which is not learned during system training process, the SMT system cannot output proper translation results.

In order to provide the best translation result by taking the advantages of these two different translation systems and making up for the drawbacks thereof, the embodiment of the present invention provides the most suitable translation selecting unit. The most suitable translated text selecting unit measures translation quality by using evaluation standards with respect to translation candidates of the input source text to select one of the translation candidates as the best translation result and outputs the best translation result.

Figure 2:
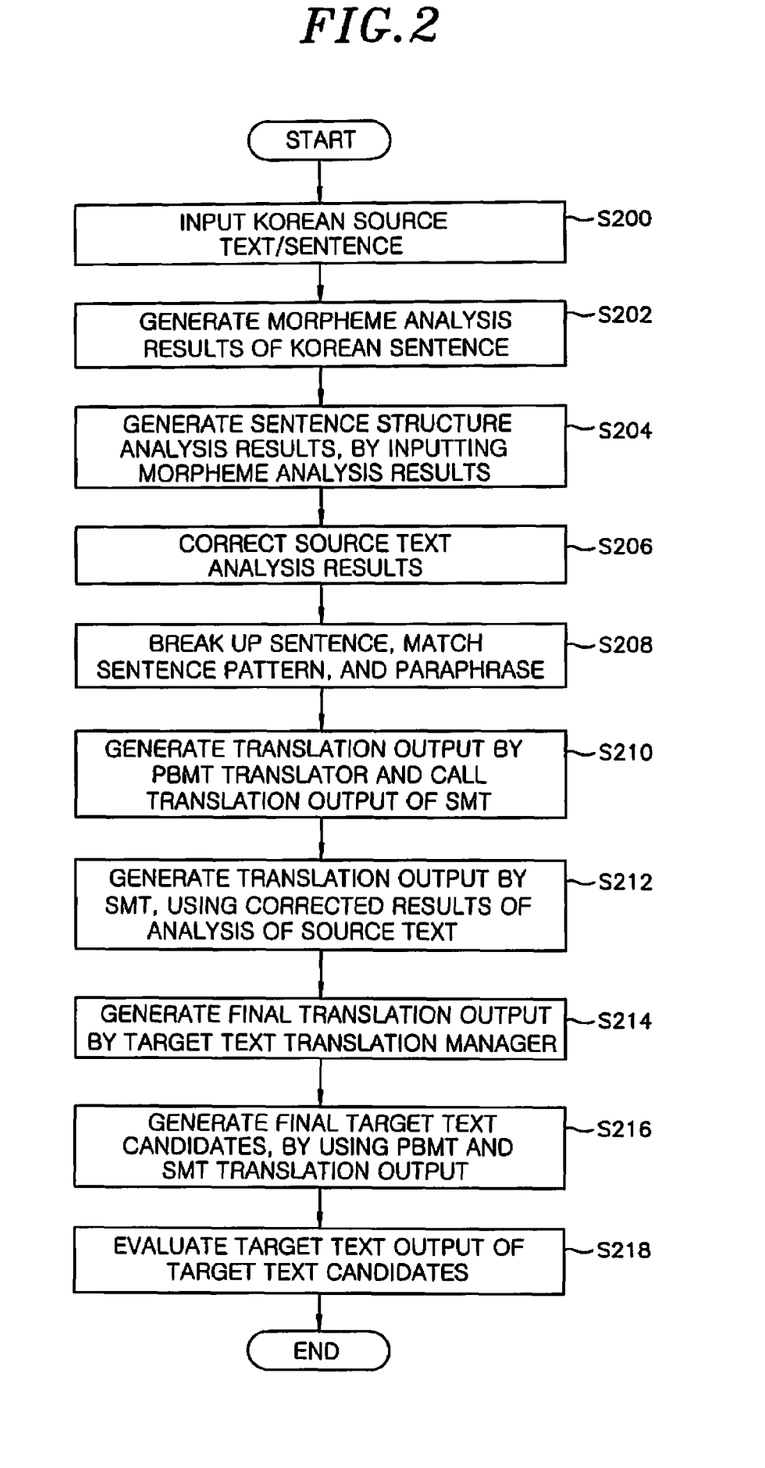
FIG. 2 describes a Korean-English hybrid automatic translation method in accordance with the other embodiment of the present invention.

FIG. 2 illustrates Korean to English translation method in accordance with another embodiment. The method will be described with reference to the flow chart of FIG. 2.

As illustrated in FIG. 2, in step S200, a Korean input source text such as a sentence shown in [Example 4] is input into a Korean analyzer 100.

Example 4

윤이 빽까지 썼는데... 언니 여기 넣어 줄려고 얼마나 용썼는지 알지?

(In English, "Even got Yun's support . . . you know how much Yun exerted utmost strength?")

In step S202, a morpheme analyzer 102 of the Korean analyzer 100 provides morpheme analysis results with respect to the Korean input source text. [Example 5] shows the morpheme analysis results.

Example 5

윤이 : 윤 [personal proper noun] 이 [subjective case particle]

빽까지 : 빽 [uninflected common noun] 까지 [adverbial case particle]

썼는데 : 쓰 [general verb] 었 [paste tense pre-final ending] 는데 [subordinate conjunctive ending] . . . [other marks]

언니 : 언니 [uninflected common noun]

여기 : 여기 [demonstrative pronoun]

넣어_줄려고 : 넣 [general verb] 어_주 [(other supplementary inflected word] ㄹ려고 [subordinate conjunctive ending]

얼마나 : 얼마나 [adverb for state/degree]

용썼는지 : 용쓰 [general verb] 었 [paste tense pre-final ending] 는지 [subordinate conjunctive ending]

알지? : 알 [general verb] 지 [interrogative final ending]? [sentence ending mark]

In step 204, a syntactic analyzer 104 of the Korean analyzer 100 receives the morpheme analysis results and generates the sentence structure analysis results. [Example 6] shows the sentence structure analysis results.

Example 6

알 [general verb]+지 [interrogative final ending]+? [sentence ending mark]

용쓰 [general verb]+었 [paste tense pre-final ending]+는지 [subordinate conjunctive ending]

얼마나 [adverb for state/degree]

넣 [general verb]+어_주 [other supplementary inflected word]+ㄹ려고 [subordinate conjunctive ending]

여기 [demonstrative pronoun]

언니 [uninflected common noun]

쓰 [general verb]+었 [paste tense pre-final ending]+는데 [subordinate conjunctive ending]+ . . . [other marks]

빽 [uninflected common noun]+까지 [adverbial case particle]

윤 [personal proper noun]+이 [subjective case particle]

☞ Restore an omitted particle

☞ Process an anaphor (restore an omitted constituent, determine an antecedent of a pronoun, and determine an antecedent of a personal pronoun)

☞ Utilize a paraphrasing pattern of each short sentence/phrase in the structure analysis (ex: 빽까지 썼다 (got a support))

알 [general verb]+지 [interrogative final ending]+?[sentence ending mark]

용쓰 [general verb]+었 [paste tense pre-final ending]+는지 [subordinate conjunctive ending]

얼마나 [adverb for state/degree]

윤 [personal proper noun]+이 [subjective case particle]

넣 [general verb]+어_주 [other supplementary inflected word]+ㄹ려고 [subordinate conjunctive ending]

여기 [demonstrative pronoun: 이_회사]+에 [adverbial case particle]

언니 [uninflected common noun: 2$^{nd}$ personal hearer]+를 [objective case particle]

윤 [personal proper noun]+이 [subjective case particle]
쓰 [general verb]+었 [paste tense pre-final ending]+는데 [subordinate conjunctive ending]+ . . . [other marks]
빽 [uninflected common noun]+까지 [adverbial case particle]
윤 [personal proper noun]+이 [subjective case particle]

It may be difficult to understand its meaning of the demonstrative pronoun, "여기" ("here") due to the lack of context information, and the like.

In step S208, a source text translation manger 200 performs the sentence segmentation, sentence pattern matching, and paraphrasing, as follows.

The sentence segmentation unit 202 performs the sentence segmentation as shown in [Example 7].

Example 7

알 [general verb]+지 [interrogative final ending]+? [sentence ending mark]
용쓰 [general verb]+었 [paste tense pre-final ending]+는지 [subordinate conjunctive ending]
얼마나 [adverb for state/degree]
윤 [personal proper noun]+이 [subjective case particle]
넣 [general verb]+어-주 [other supplementary inflected word]+ㄹ려고 [subordinate conjunctive ending] 여기 [demonstrative pronoun: 이_회사]+에 [adverbial case particle]
언니 [uninflected common noun: 2nd personal hearer]+를 [objective case particle]
윤 [personal proper noun]+이 [subjective case particle]
//(here, the sentence is segmented)
썼는데 쓰 [general verb]+었 [paste tense pre-final ending]+는데 [subordinate conjunctive ending]+ . . . [other marks]
빽 [uninflected common noun]+까지 [adverbial case particle]
윤 [personal proper noun]+이 [subjective case particle]

When the number of inflected clauses connected with a conjunctive ending is three or more, the sentence is segmented only when there is a certain coordinate conjunction and a reliable basis for the sentence segmentation.

Results of the sentence segmentation are used in PBMT and SMT.

Subsequently, the sentence pattern matching unit 204 performs a sentence pattern matching process to output applying results of the sentence pattern matching as shown in [Example 8].

Example 8

Sentence pattern: VP1+ 는지 알지?/VP1+는 줄 알잖아.
=>You Know, VP1(+source text conversion rule 1).
언니 여기 넣어 줄려 고 얼마나 용썼는지 알지?
=>You Know, VP1(언니 여기 넣어 줄려 고 얼마나 용썼다.)

The sentence pattern includes the paraphrasing information with respect to a sentence unit and is described, interworking with the source text conversion rules if necessary.

Examples of the source text conversion rules is as follows:
Conversion Rule 1:
interrogative sentence<->declarative sentence
Interrogative adverb<->assertive adverb of declarative sentence
얼마나 (in an interrogative sentence) <->많이/매우 (in a declarative sentence)
(conversion of negative sentence<->affirmative sentence, conversion of passive voice<->active voice, conversion of exclamatory sentence<->declarative sentence)

Before conversion: VP1: 언니 여기 넣어 줄려고 얼마나 용썼다

After conversion: VP1: 언니 여기 넣어 줄려고 많이 용썼다.

Subsequently, a paraphraser 206 provides paraphrasing patterns results mainly with respect to short sentences/phrases, as shown in [Example 9].

Example 9

Pattern 1: 빽+를 쓰+다 => 다른사람들+에게 도움+를 받!다
(translation link information of inflected phrase pattern)
Pattern 2: 용쓰+다 / 애쓰+다 =>노력하+다
Pattern 3: $직장+에 넣어주+다 =>$직장+에 취직시켜주+다

빽-를 쓰-었는데 (got support from a backer)=> 다른사람들+에게 도움-을 받-았는데 (got help from others)

많이 용쓰-었는지 (exert one's utmost strength)=>많이 노력하-었는지 (pull strings)

언니-를 여기-에 넣-어주-려고 (to put you here)=>언니-를 여기-에 취직시켜주-려고 (to get you a job her)

With respect to pattern 3, only when "여기" ("here") is considered as a work place, paraphrasing is available. If it is not paraphrased, it is translated by being applied to the inflected phrase pattern of 'A!를 B=$장소!에 넣어주!다' ('put! A! to B=$location!').

The paraphrasing pattern includes the vocabulary/morpheme/meaning level and the short sentence/phrase level.

The paraphrasing pattern used in the paraphraser 206 is to enable a free translation or to enable idiomatic expressions to be easily translated by changing them into a word for word translation form.

The SMT engine may additionally call the paraphraser 206.

The method according to the present embodiment includes a step of revising the analysis results in step S206. In the step of revising the analysis results, the results of the sentence segmentation, the sentence pattern matching and paraphrasing are reflected, as shown in [Example 10].

Example 10

노력하 [general verb]+었 [paste tense pre-final ending]+다 [final ending]
많이 [adverb for state/degree]
윤 [personal proper noun]+이 [subjective case particle]
취직시키 [general verb]+어_주 [other supplementary inflected word]+ㄹ려고 [subordinate conjunctive ending]
여기 [demonstrative pronoun: 이_회사]+에 [adverbial case particle]
언니 [uninflected common noun: 2nd personal hearer]+를 [objective case particle]
윤 [personal proper noun]+윤 [subjective case particle]
받 [general verb]+받 았 [paste tense pre-final ending]+는데 [subordinate conjunctive ending]+ . . . [other marks]
도움 [uninflected common noun]+을 [objective case particle]
다른_사람들 [uninflected common noun+에게 [adverbial case particle]
윤 [personal proper noun]+이 [subjective case particle]

Information of the Korean source text prior to a post-processing is transferred with the revised results.

Subsequently, in step S210, a PBMT translator 410 of a translator 400 generates translation outputs as shown in [Example 11] and translation outputs of a SMT translator 420 of the translator 400 are called. In step S212, translation result is generated by using source text analysis results revised by the SMT translator 420 as shown in [Example 12].

Example 11

Source text 1: 윤-이 다른 사람들-에게 도움-을 받-았는데 ....
=> Yun got help from others.
Source text 2: 윤-이 언니-를 여기-에 취직시켜주-려고 (윤-이) 많이 노력하-었다.
=> Yun tried so much to get you a job here.

Example 12

Source text 1: 윤-이 다른 사람들-에게 도움-을 받-았는데 ....
=> Other people helped Yune.
Source text 2: 윤-이 언니-를 여기-에 취직시켜주-려고 (윤-이) 많이 노력하-었다.
=> Yune pulled strings to get you a job here.

Subsequently, in step S214, final translation output as shown in [Example 13] is generated through the target text composing unit 504 of the target text translation manager 500.

Example 13

Sentence 1. 윤-이 다른 사람들-에게 도움-을 받-았는데 ....
PBMT: Yun got help from others.
SMT: Other people helped Yune. But??
Sentence 2. 윤-이 언니-를 여기-에 취직시켜주-려고 (윤-이) 많이 노력하-었다.
PBMT: Yun tried so much to get you a job here.
SMT: Yune pulled strings to get you a job here.

The processes are performed, such as combination of sentence pattern application information, connection between sentences, unification of translation of proper nouns, making repeated constituents as pronouns, sequence of tenses, and the like.

The connection between sentences is made based on the connection pattern.

The translation results of the PBMT and the SMT system with respect to sentences 1 and 2 are combined to generate 2×2 final translation candidates.

The SMT system can generate one or more short sentence candidates as follows:

1. SENT1-PBMT+SENT2-PBMT:
Yun got help from others. You Know, Yun (he) tried so much to get you a job here.
2. SENT1-PBMT+SENT2-SMT:
Yun got help from others. You Know, Yun (he) pulled strings to get you a job here.
3. SENT1-SMT+SENT2-SMT
Other people helped Yune. But You know, Yun (he) pulled strings to get you a job here.
4. SENT1-SMT+SENT2-PBMT
Other people helped Yune. But You know, Yun (he) tried so much to get you a job here.

Subsequently, in step S216, the final translation candidates as shown in [Example 14] are generated from the translation output of the PBMT and SMT system by translation selecting unit 502 of the target text translation manager 500.

Example 14

Source text: 윤이 빽까지 썼는데 ?? 언니 여기 넣어 줄려고 얼마나 용썼는지 알지?
Final translation candidates:
1. Yun got help from others. You know, Yun (he) tried so much to get you a job here.
2. Yun got help from others. You know, Yun (he) pulled strings to get you a job here. (PBMT+SMT)
3. Other people helped Yune. But You know, Yun (he) pulled strings to get you a job here.
4. Other people helped Yune. But You know, Yun (he) tried so much to get you a job here.

Among the final translation candidates, the following final translation is determined based on a weight calculated in consideration with (1) LM (5-gram), (2) TM (accuracy rate of keywords translation), (3) inflected phrase pattern (pattern matching rate), (4) amount of English vocabulary information, and (5) the time required.

Final translated text: Yun got help from others. You know, he pulled strings to get you a job here.

The quality of the finally selected translation depends on how the most suitable translated text selecting unit sets up the evaluation standards of the translation quality. Therefore, it is necessary to employ the objective evaluation standards regardless of a method of designing a translation system, and basic evaluation standards such as (1) translation Fluency, (2) translation accuracy with respect to content word, (3) inadequacy of translation, and (4) connection property of conversational context flow. An integrated evaluation value is calculated by applying the weight according to the degree of importance of each evaluation standard. During calculating process of the integrated evaluation value, in step S218, the translation quality is evaluated as follows by distinguishing the common sequence of words and the different sequence of words between the translation outputs and focusing on the different sequence.

(1) Translation Fluency: Probability of a linguistic model is measured by applying the n-gram (5-gram) linguistic model with respect to the sequence of words constituting the translated text. As the translated text has the higher probability, it is regarded as the more fluent translated text. The linguistic model is learned from the conversational English sentence aggregation with high capacity. The linguistic model of a vocabulary level and the linguistic model considering semantic and syntactic information are applied.

(2) translation accuracy with respect to content word: accuracy of selecting translation words with respect to only content words among the words/sentence structures constituting the translated text is calculated as a probability. Specifically, when measuring the translation accuracy with respect to the content words, a score is calculated, focusing on the difference between the translation outputs. That is, the different parts between the translation outputs are divided, and the translation accuracy of the content words with respect to each divided different part is calculated, based on a normalized word arrangement model.

(3) Inadequacy of translation: This is to evaluate how many translation words with a predetermined probability or less than are included in the translation output. As the translation output has more translation words, the quality of the translation is considered as being low.

(4) connection adequacy of conversational context flow: the adequacy of conversational context connection flow is applied to select a suitable complex sentence when a complex sentence and/or compound sentence is generated by combining the translation outputs of short sentences. The adequacy of conversational context connection flow is evaluated by applying a short sentence connection linguistic model focusing on a sentence pattern.

As described above, the method and apparatus for providing hybrid machine translation from Korean to English according to the present invention are realized by taking the advantages of both of the PBMT technology and the SMT technology, to generate more improved final translation output.

Therefore, in accordance with the present invention, first, a Korean sentence is accurately segmented into translatable unit; second, a translation speed is improved by the sentence segmentation; third, translation performance is improved through the sentence segmentation; fourth, analysis and translation performance is improved by paraphrasing an input text, and fifth, more excellent translation output is selected by a translated text selecting unit.

While the invention has been shown and described with respect to the preferred embodiments, it will be understood by those skilled in the art that various changes and modifications may be made without departing from the spirit and scope of the invention as defined in the following claims.

What is claimed is:

1. A Korean-English hybrid automatic translation method for providing translation from Korean to English, comprising:
    performing a morpheme analysis and a syntactic analysis on a Korean input source sentence;
    segmenting the Korean input source sentence into at least two Korean clause units, based on the results of the morpheme analysis and the syntactic analysis;
    generating a pattern-based machine translation (PBMT) clause unit and a statistical machine translation (SMT) clause unit corresponding to each of the Korean clause units;
    selecting one among the PBMT clause unit and the SMT clause unit for each of Korean clause units, based on predetermined weight information;
    combining the selected clause units to generate a final translation result; and
    outputting the final translation result as an English text that corresponds to the Korean input source sentence.

2. The method of claim 1, further comprising:
    performing sentence pattern matching and paraphrasing after performing the morpheme analysis and the syntactic analysis.

3. The method of claim 1, further comprising:
    revising the Korean clause units and then generating the PBMT clause unit and the SMT clause unit thereof, respectively.

4. The method of claim 1, wherein the predetermined weight information includes weight for the Korean input source sentence, time limit, weight for a linguistic model, weight for a translation model, and a combination thereof.

5. A Korean-English hybrid automatic translation apparatus for providing hybrid machine translation from Korean to English, comprising:
    a source text translation manager configured to receive analysis results from a Korean analyzer configured to analyze a Korean input source sentence, segment the Korean input source sentence into at least two Korean clause units, and normalize each of the Korean clause units;
    a translator configured to generate pattern-based machine translation (PBMT) clause units and statistical machine translation (SMT) clause units corresponding to each of the normalized Korean clause units; and
    a target text translation manager configured to select one among the PBMT clause units and the SMT clause units for each of the Korean clause units to generate a final translation result, and output the final translation result as an English text corresponding to the Korean input source sentence.

6. The apparatus of claim 5, wherein the source text translation manager includes:
    a sentence segmentation unit configured to segment the Korean input source sentence into at least two Korean clause units;
    a sentence pattern matching unit configured to provide English translation information corresponding to an expression in the Korean input source sentence based on sentence patterns in the clause units of the Korean input source sentence; and
    a paraphraser configured to paraphrase the Korean input source sentence.

7. The apparatus of claim 6, wherein the sentence pattern matching unit is configured to build the sentence patterns with respect to each of the Korean clause units with a certain number of words, determine sentence pattern types, and perform patterning.

8. The apparatus of claim 6, wherein the paraphraser is configured to paraphrase expressions in each of the Korean clause units of the Korean input source sentence without distorting the meaning thereof.

9. The apparatus of claim 5, wherein the target text translation manager includes:
    a segment composing unit configured to combine any of the selected PBMT clause units and the selected SMT clause units and generate a plurality of English text candidates corresponding to the Korean input source sentence; and
    a translated text selecting unit configured to select one among the plurality of English text candidates as the English text corresponding to the Korean input source sentence, by using weight for the Korean input source sentence, time limit, weight for a linguistic model, and weight for a translation model.

10. The apparatus of claim 9, wherein the segment composing unit is configured to:
    consider, in combining the selected PBMT clause units and the SMT clause units, any of sentence patterns, connection of the selected PBMT clause units and the SMT clause units based on a connection pattern of the clause units constituting the Korean input source sentence, and a combination thereof.

* * * * *